United States Patent [19]

Krochta

[11] Patent Number: 5,019,403

[45] Date of Patent: May 28, 1991

[54] COATINGS FOR SUBSTRATES INCLUDING HIGH MOISTURE EDIBLE SUBSTRATES

[75] Inventor: John M. Krochta, Davis, Calif.

[73] Assignee: The United States of America as represented by the Secretary of Agriculture, Washington, D.C.

[21] Appl. No.: 450,192

[22] Filed: Dec. 13, 1989

[51] Int. Cl.$^5$ .............................................. A23B 4/10
[52] U.S. Cl. ..................................... 426/89; 426/92; 426/93; 426/99; 426/100; 426/302; 426/305
[58] Field of Search ...................... 426/89, 92, 93, 99, 426/302, 303, 305, 310, 100

[56] References Cited

U.S. PATENT DOCUMENTS

| 2,282,801 | 5/1942 | Musher | 99/154 |
| 2,470,281 | 5/1949 | Allingham | 99/169 |
| 2,560,820 | 7/1951 | Recker | 99/168 |
| 2,703,760 | 3/1955 | Cunning | 99/168 |
| 3,323,922 | 6/1967 | Durst | 426/89 |
| 3,451,826 | 6/1969 | Mulder | 99/168 |
| 3,997,674 | 12/1976 | Ukai et al. | 426/90 |
| 4,504,502 | 3/1985 | Earle et al. | 426/293 |
| 4,915,971 | 4/1990 | Fennema et al. | 426/89 |

FOREIGN PATENT DOCUMENTS 230999  12/1985  Fed. Rep. of Germany ...... 426/603

OTHER PUBLICATIONS

J. J. Kester and O. R. Fennema, "Edible Films and Coatings: A Review," *Food Technology* 40: 47–59 (1986).

S. Guilbert, "Technology and Application of Edible Protective Films," *Food Packaging and Preservation—Theory and Practice*, Ed. M. Mathlouthi, Elsevier Applied Science Publishing Co., London, England (1986), pp. 371–394.

*Primary Examiner*—Donald E. Czaja
*Assistant Examiner*—D. Workman
*Attorney, Agent, or Firm*—M. Howard Silverstein; John D. Fado; Margaret A. Connor

[57] ABSTRACT

A method for coating substrates, including high moisture substrates and substrates having high moisture at the surface, with emulsions or suspensions of a water-soluble protein material and hydrophobic material. By adjusting the pH of the protein material in the emulsion or suspension to its isoelectric point in situ, that is, when the emulsion or suspension is in contact with the substrate, the protective properties of the resulting film are improved. Substrates coated by the method showed greatly reduced moisture loss. The method provides a way to form stable films on substrates having moist surfaces. The method is particularly useful to protectively coat agricultural products, including edible high moisture products, which are subject to deterioration from moisture loss, respiration or oxidation.

20 Claims, 2 Drawing Sheets

COATINGS FOR SUBSTRATES INCLUDING HIGH MOISTURE EDIBLE SUBSTRATES

BACKGROUND OF THE INVENTION

1. Field of the Invention

The invention relates to protective coatings for substrates, including high moisture edible substrates. More particularly, the invention relates to coating compositions, and to a novel method of forming a protective coating on substrates from emulsions and suspensions of proteins and hydrophobic materials.

2. Description of the Art

Protective coatings are useful to protect a base substrate from the deteriorative effects of gases such as oxygen, from detrimental environmental conditions such as high or low humidity, and from factors which cause biological degradation. Substrates, especially those containing moisture and which have the propensity to lose moisture through evaporation, e.g., agricultural products, are particularly vulnerable to loss of quality of the substrate over time. Edible agricultural products such as fresh, frozen, whole or cut, fruits and vegetables, meat, fish, eggs, grains, nuts, and inedible agricultural products such as living plants, plant products, and ornamentals are subject to loss of quality over time from moisture loss, enhanced respiration and senescence, and browning and oxidative degradation. Other deterimental effects to agricultural products can result from microbial attack and moisture penetration.

Specifically, many edible products and plant materials such as fruits, vegetables, grains, eggs, plants, and ornamentals, continue to maintain life function after harvest. They continue to respire until decay, consuming oxygen and producing carbon dioxide. The time these products are available in a fresh and attractive form can be extended, if respiration can be slowed down by limiting availability of oxygen or if the carbon dioxide level can be maintained at an optimum level.

Further, many edible products and plant materials have components which are vulnerable to oxidation, with resultant loss in quality, as oxygen diffuses into the tissue of the food or plant material. For example, fresh and frozen fish, frozen fruits and vegetables, nuts, and ornamentals have a limited shelf-life which is due to such oxidation. The time these products are available in a quality form can be extended, if oxidation can be slowed down by limiting diffusion of oxygen into the product.

Many substrates such as edible products and plant materials have a high moisture content and are vulnerable to quality loss as they lose their moisture to the air. In particular, fresh fruits and vegetables, eggs, fish, living or cut trees, plants, and ornamentals, for example, have a limited shelf-life which is due in part to loss of moisture to the atmosphere. Products which have peels, skins, or shells tend to have retarded moisture loss; but over a period of time enough moisture can be lost to lower the product quality to the point of product rejection.

Substrates which are high in moisture content and have high moisture at the surface are particularly vulnerable to loss of quality due to moisture loss. Examples are fruits and vegetables and other foods, and plant products which have exposed tissue surfaces created by peeling, cutting, etc. such as peeled and/or sliced apples, sliced tomatoes, peeled eggs, fish filets, and cut-stem flowers. Because their natural skins, peels, and shells, which normally act to retard moisture loss have been removed, these products lose their quality quickly.

Edible films have been proposed for use on foods to control respiration, reduce oxidation, or limit moisture loss. (See: J. J. Kester and O. R. Fennema, "Edible Films and Coatings: A Review," *Food Technology* 40: 47–59 (1986) and S. Guilbert, "Technology and Application of Edible Protective Films," *Food Packaging and Preservation Theory and Practice*, Ed. M. Mathlouthi, Elsevier Applied Science Publishing Co., London, England (1986), pages 371–394). Coatings for edible products include wax emulsions (U.S. Pat. No. 2,560,820 to Recker and U.S. Pat. No. 2,703,760 to Cunning); coatings of natural materials including milk solids (U.S. Pat. No. 2,282,801 to Musher), lecithin (U.S. Pat. No. 2,470,281 to Allingham and U.S. Pat. No. 3,451,826 to Mulder), algin and a gelling mixture (U.S. Pat. No. 4,504,502 to Earle and McKee), protein (U.S. Pat. No. 4,344,971 to Garbutt), dispersions of a hydrophilic film former and an edible fat (U.S. Pat. No. 3,323,922 to Durst), and dispersions of hydrophobic materials in aqueous solutions of water-soluble high polymers (U.S. Pat. No. 3,997,674 to Ukai et al.).

In most cases, the foods to be protected have been whole, uncut foods with peels and skins in place, for example, whole unpeeled apples, whole tomatoes, and unpeeled eggs. In these cases, an edible film is formed on, and supplements, a surface which has low-moisture content, e.g., an apple peel or an egg shell, and already acts as a gas (oxygen or carbon dioxide) and moisture barrier. The film is not in direct contact with a high-moisture surface. Suitable coatings for high moisture substrates having high moisture at the surface such as peeled fruits and vegetables and eggs, have not been developed heretofore.

SUMMARY OF THE INVENTION

The invention provides a novel method to coat the surface of a substrate with an emulsion or suspension of a protein material and a hydrophobic material. Coated substrates and coating compositions prepared in accordance with our method are encompassed by the invention. A novel feature of our method is that the protein-hydrophobic material emulsion or suspension is treated in situ on the substrate to modify the protein and increase the protective properties of the resulting film.

In the method of the invention, an emulsion or suspension comprising a hydrophobic material and an aqueous solution of a water-soluble protein material is applied to a substrate. Next, the protein in the emulsion or suspension is adjusted to about the isoelectric point of the protein. Surprisingly, by modifying the protein in situ in this manner, the protective properties of the resulting film on the coated substrate are greatly improved. An additional benefit of the protein modification step in some cases is that the protein in the coating is rendered insoluble in an aqueous environment.

The invention is particularly useful to preserve the quality and shelf life of perishable substrates such as high moisture edible and inedible agricultural products which are subject to deterioration from moisture loss (i.e., dehydration), respiration and senescence, browning and oxidative degradation, microbial attack, or moisture penetration.

The invention improves on coating compositions and processes based on hydrophobic materials (e.g., waxes) or protein-hydrophobic material dispersions known heretofore for maintaining the quality of substrates such as whole (unpeeled or unskinned) fruits, vegetables, and eggs.

Further, the invention provides protective coatings for high moisture substrates having high moisture surfaces such as peeled or cut fruits and vegetables, peeled eggs, and fish filets. Heretofore, no coating had been developed for this type of product.

Surprisingly, a coating prepared with the additional in situ pH modification step in accordance with the invention has high protective properties. Of considerable importance is the fact that the coating provides an excellent moisture barrier so as to achieve an unexpectedly great reduction in moisture loss from the coated substrate in comparison to substrates having coatings prepared without in situ protein modification. Thus, food products or plant materials coated by the method have increased shelf-life.

In accordance with this discovery it is an object of the invention to provide a method to form a protective coating on substrates, including high moisture edible and inedible agricultural substrates.

A further object of the invention is a method to form protective coatings of high moisture substrates having high moisture at the surface such as peeled, cut, or sliced agricultural products.

Another object of the invention is the provision of substrates coated by the method of the invention.

Other objects and advantages of the invention will become readily apparent from the ensuing description.

DETAILED DESCRIPTION OF THE INVENTION

Figure 1:
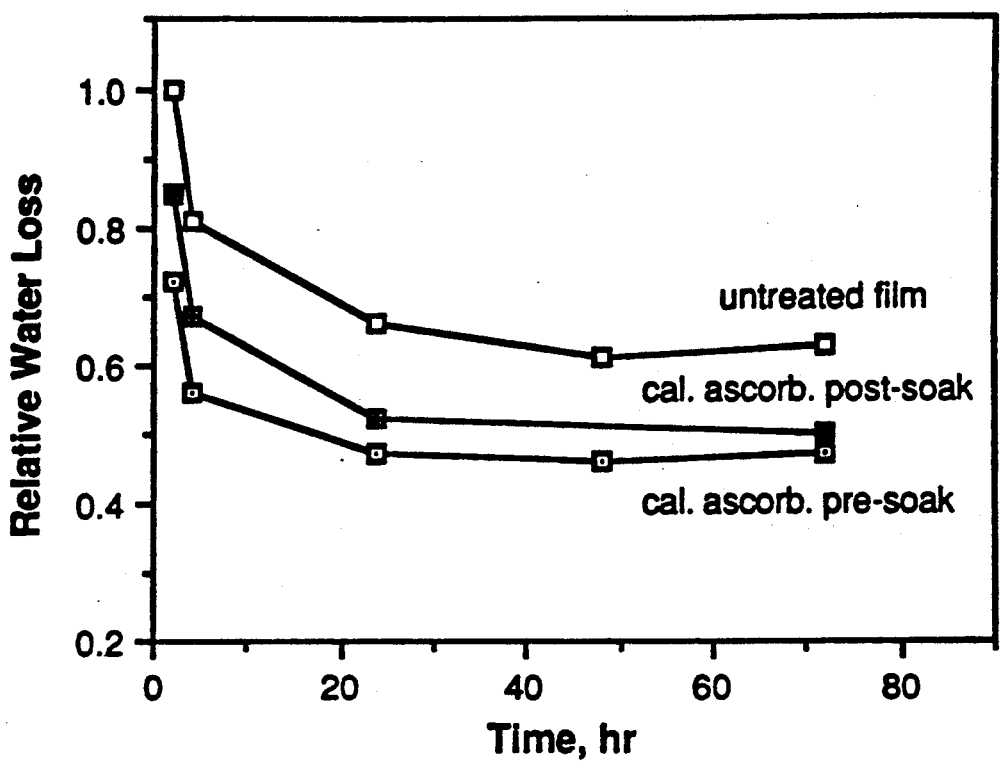
FIG. 1 shows the effect of time on the water loss of peeled and cut apple pieces (cylinders 1 cm in diameter and 1 cm long) which have been coated with casein-acetylated monoglyceride emulsion films, relative to the water loss from an apple piece with no film. The coating composition for the films was 15% sodium caseinate and 20% acetylated monoglyceride in water.

The invention provides a means for forming a protective coating on a substrate. The invention is useful to protect a base substrate from deteriorative effects of environmental gases (air, oxygen, etc.), moisture transmission, and from factors which cause biological degradation of a substrate. The invention finds particular use for preserving the quality of agricultural products which are vulnerable to loss of quality due to moisture transmission, respiration or oxidation. Of particular importance is the provision of protective coatings for moisture-containing substrates which lose product quality through dehydration. Exemplary of such substrates are high moisture substrates and high moisture substrates having high moisture at the surface, such as edible and inedible agricultural products. Examples of high moisture edible agricultural products include fresh or frozen fruits and vegetables, fish, eggs, baked goods, and cheese. Examples of high moisture inedible agricultural products include plants, plant materials, ornamentals, and plant cuttings. Examples of high moisture substrates having high moisture at the surface are agricultural products which have one or more exposed tissue surfaces caused by peeling, cutting, chopping, breaking, coring, pitting or other physical treatment. Examples of edible substrates include cored, peeled or cut fruits and vegetables, e.g., peeled apple, apple slices, tomato slices; peeled eggs, and fish filets. Examples of inedible substrates include tissue cultures and cut-stem flowers. Other agricultural products such as grains and nuts can also be protected using the coating method of the invention. Nonagricultural substrates can also be coated with a protective coating in accordance with the invention.

In the method of the invention, an emulsion or suspension of a water-soluble protein material and a hydrophobic material is applied to the surface of the substrate to coat the substrate. Next, the protein material in the emulsion or suspension is adjusted to about the isoelectric point of the protein material. For purposes of this invention, the phrase "water-soluble protein material" includes proteins that are water soluble and water-soluble forms of insoluble proteins. The protein material functions as a water-soluble high polymer having hydrophilic groups which can include hydroxyl, carboxyl or amino groups. Protein materials useful for practice of the invention include the water-soluble form of casein, whey protein, wheat gluten, corn zein, soybean protein, bran protein, gelatin and the like. Example are sodium caseinate, sodium proteinate of soybean, alkaline treated whey protein, and gelatin. Water-soluble protein materials can be readily obtained by processes known in the art, and many are available commercially. For example, food grade sodium caseinates are available commerically in a range of viscosities.

The hydrophobic material includes a hydrophobic solid which forms a suspension when blended with an aqueous solution of the water-soluble protein material or a hydrophobic liquid with low affinity for water which forms an emulsion when blended with an aqueous solution of water-soluble protein material. Examples of hydrophobic materials include natural waxes such as beeswax and carnauba wax; natural oils such as soybean, cottonseed, corn, safflower, peanut, sunflower, linseed, and sesame; hardened oil resulting from hydrogenation of such oils; modified natural oils such as acetylated monoglycerides, and mineral oils such as paraffin and microcrystalline paraffin. These materials can be readily obtained by processes known in the art, and many are available commercially. Many are commercially available in food-grade form. The particle size of the hydrophobic material is in a range to obtain a substantially uniform emulsion or suspension when blended with the aqueous solution of water-soluble protein material.

Methods of preparing an emulsion or suspension are known. One convenient method is to dissolve the water-soluble protein material in water, and blend the hydrophobic material into the protein solution to form an emulsion or suspension. Where the hydrophobic material is a solid at room temperature, the formation of the emulsion or suspension is conveniently carried out above the melting point of the hydrophobic material. The amount of hydrophobic material blended into the aqueous protein solution and the range of hydrophobic material to protein material in the emulsion or suspension is that which forms a uniform emulsion or suspension. The preferred ratio range of hydrophobic material to protein material in the emulsion or suspension is 0.1:1 to 10:1 (wt/wt). The viscosity of the emulsion or suspension is that which is effective to substantially uniformly coat the surface of the substrate. Additives such as anti-oxidants, flavors, fragrance, or nutrients may be incorporated into the emulsion or suspension.

The emulsion or suspension of aqueous solution of water-soluble protein material and hydrophobic material is applied onto a substrate to form a substantially continuous coating on the surface of the substrate. The coating is applied in any manner known in the art, such as by spraying, dipping, falling-film enrobing, pouring, or brushing.

The water-soluble protein material in the emulsion or suspension coated on the substrate is adjusted to about its isoelectric point in situ, that is, the adjusting is carried out when the coating is in contact with the substrate. The isoelectric point of a protein is defined as the pH value where the positive and negative charges on the protein are balanced. The value for a particular protein material can readily be determined by reference to the scientific literature. For purposes of the invention, the term "about the isoelectric point" means the pH of the isoelectric point for the protein material plus or minus 0.5 pH unit. Adjustment of protein pH may be carried out in several ways. The preferred way is to expose the emulsion or suspension on the substrate to an aqueous solution of an appropriate buffer. Stepwise addition of dilute acid or alkali may also be used. If so desired, excess buffer or other adjusting solution may be washed out of the resulting film.

Adjustment of the pH of the protein material in the emulsion or suspension can be carried out in several ways as is convenient for a particular substrate. For example, adjustment can be accomplished by additional dipping, falling-film enrobing or spraying the substrate surface with an adjusting solution, either before or after dipping, enrobing or spraying the substrate with the emulsion or suspension. This additional treatment to adjust the emulsion or suspension to about the protein isoelectric point can be carried out before, sometime during, or after the drying of the emulsion or suspension on the substrate. Since additional water is added to the coating with this additional treatment, additional drying is carried out to form a film on the surface of the substrate. During drying, water which has been acting as a solvent for the protein material and as the dispersion medium for the hydrophobic material largely evaporates leaving a film membrane consisting of particles or droplets of the hydrophobic material embedded in a concentrated protein matrix. Drying is carried out by any suitable drying method such as drying in air, or drying with or without heating. The temperature of heating should be below that which would adversely affect either the resulting film or the base substrate.

As discussed above, adjustment of protein pH may be carried out in various ways. For example, one procedure is to apply the emulsion or suspension to the substrate, dry the coated substrate, and treat the coated substrate with a solution to adjust the pH of the protein in the coating to about the isoelectric point. The coated substrate is then dried again to remove excess water and form a film surrounding the substrate comprising a hydrophobic material in a protein matrix. A second procedure is to treat the substrate with the pH adjustment solution prior to coating the substrate, and then apply the emulsion or suspension to the substrate. The substrate is then dried so that the pH adjusted emulsion or suspension forms a film. A third procedure is treatment of the substrate with the pH adjusting solution before and after application of the emulsion or suspension to the substrate. In all cases, the adjustment of the pH of the protein material in the emulsion or suspension is carried out in situ, that is, when the emulsion or suspension is on the surface of the substrate. The film membrane which results after water evaporation consists of particles or droplets of the hydrophobic material embedded in and surrounded by a concentrated protein matrix.

The unique and unexpected result of the in situ adjustment of protein pH is that the protein is modified such that the protective properties of the resulting film are greatly improved. Of particular importance is the fact that the gas (oxygen and carbon dioxide)- and moisture-transmission properties of the resulting film are modified. Of considerable importance is that the coating having the modified protein provides an excellent moisture barrier so as to achieve an unexpectedly great reduction in moisture loss from the coated substrate in comparison to substrates having coatings prepared without in situ protein modification. For example, as shown in Examples 5 and 6 below, apple pieces (which were used as a model for all fruits and vegetables with large moisture content and high moisture at the surface) coated in accordance with the method of the invention showed about a 25 to 40% reduction in moisture loss over apple pieces coated with the same film but without the in situ protein modification step. This represents a 35–70% improvement in the resistance of the film to moisture transmission. In view of these results, it is clear that high moisture food products, plant materials, or other substrates vulnerable to loss of product quality by dehydration can have increased product quality when coated in accordance with the method of the invention.

It is theorized that adjustment of the protein material to its isoelectric point increases the protective properties of the resulting film due to the balancing of the number of positive and negative charges which change the net charge of the protein to zero. Thus, the protein undergoes changes in molecular configuration and can interact more closely with other protein molecules. In some cases, the change in molecular configuration is such that the formerly water-soluble protein is rendered insoluble. This is of particular benefit when the coating is applied to substrates having high moisture at the surface because a film which includes the insolubilized protein will not migrate into the moist surface of the substrate. As a result, the film retains its integrity. This change in molecular structure modifies the protein's ability to provide resistance to gas and moisture transmission in the coating as discussed above. Thus agricultural products such as high moisture substrates and high moisture substrates having high moisture at the surface which have been coated in accordance with the invention have preserved quality due to reduction in moisture loss, control of respiration, reduction or elimination of browning, and reduction in moisture penetration.

The invention improves on coating compositions and processes based on hydrophobic materials (e.g., waxes) or protein-hydrophobic material dispersion known heretofore for maintaining the quality of whole (unpeeled or unskinned) fruits, vegetables, eggs, fish, and other high moisture substrates. And for the particular case of fruits, vegetables, eggs, and fish which have been peeled, cut, or skinned (e.g., high moisture, moist surface substrates), no coating has heretofore been developed for this type of product. Such peeled, cut or skinned agricultural products, due to the high moisture content of their surface because of peel-removal, slicing, etc., pose special difficulties for coating systems. Wax materials by themselves, because of their extreme hydrophobic nature, do not adhere well to such moist surfaces and easily pull away. On the other hand, water-soluble high-polymer hydrophilic materials such as proteins and polysaccharides adhere to such moist surfaces but offer little resistance to moisture loss from the intended products. In addition, because these hydrophilic materials are soluble in an aqueous environment, films based on or including them, such as protein-hydrophobic material dispersions, will eventually dissolve when placed on a moist surface and lose their integrity. (See Example 1, below.) In contrast, the invention provides a means for coating these products.

EXAMPLES

The following examples are intended only to further illustrate the invention and are not intended to limit the scope of the invention which is defined by the claims.

MATERIALS AND METHODS

Water soluble protein materials. "Alanate" 110 is a commercially available (New Zealand Milk Products) food grade water-soluble sodium caseinate having good emulsifying capacity.

"Alanate" 166 is a commercially available (New Zealand Milk Products) food grade water-soluble sodium caseinate having low viscosity and good emulsifying capacity.

"Myvacet" 5-07 is a commercially available (Eastman Chemical Products, Inc.) acetylated monoglyceride. It has approximately 50% acetylation and has an iodine number (which is a measure of unsaturation in the monoglyceride fatty acid) of a maximum of 5. Buffers. Sodium acetate buffer solution was prepared by adding 37.8 g of acetic acid and 30.3 g of sodium acetate to distilled water to make a total volume of 1 liter. Thus, the solution was 0.63 M in acetic acid and 0.37 M in sodium acetate.

Calcium ascorbate buffer solution was prepared by adding 59.3 g of ascorbic acid and 227.4 g of calcium ascorbate to distilled water to make a total volume of 1 liter. Thus, the solution was 0.34 M in ascorbic acid and 0.58 M in calcium ascorbate (1.16 M in ascorbate ion).

Sodium ascorbate buffer solution was prepared by adding 200 g ascorbic acid and 28.6 of sodium hydroxide to distilled water to make a total volume of 1 liter. Thus, the solution was 0.42 M in ascorbic acid and 0.72 M in sodium ascorbate.

Film Permeability Test Cell. Moisture transmission through films was determined using a film permeability test cell (T. H. Schultz et al., *J. Phys. Colloid Chem.* 53: 1320–1330 (1949)). The only modification was incorporation of a small mesh screen to support the film and keep it from drooping and touching the water. Four ml of distilled water was placed in the shallow aluminum cup system. A film was then cut to the appropriate size and positioned on the screen on the cup, between a gasket and ring held in place by screws. After assembly, the cups with films in position were weighed and placed in a desiccator containing anhydrous calcium sulfate (Indicating Drierite, W. S. Hammond Drierite Co, Xenia, OH). This provided a large driving force across the film for moisture transmission. Four test cells could be placed in a desiccator. This allowed side-by-side comparison of water loss from cells with no film, films not adjusted to the protein pH, and films adjusted to the protein pH in accordance with the method of the invention.

Cells were removed from the desiccator at 2, 4, and 6 hours, and oftentimes 24 hours, and weighed to determine water loss. Comparisons were run in duplicate in a separate desiccator, and reported results are the average of the two runs.

EXAMPLE 1

Example 1 provides information about films which were prepared not in accordance with the method of the invention. This material is presented for comparison purposes.

Casein Film. Five g of of sodium caseinate ("Alanate" 110, New Zealand Milk Products) was added slowly to 42.5 g of water. After the sodium caseinate totally dissolved, 2.5 g of glycerol was added and mixed well into the solution. (It was found that it was necessary to add glycerol as a plasticizer; otherwise, films cracked and splintered and could not be studied.) A film was made by pouring 5 ml of the solution onto a plexiglass plate sitting on a level surface and spreading the solution or emulsion evenly over a circle with a diameter of 10 cm. The film solution was allowed to dry overnight (approximately 18 hours). The result was a film which could be peeled intact from the plexiglass surface and be tested for moisture transmission by placement in a transmission test cell. After this test, the film was placed in water to determine whether it would maintain its structure or dissolve. The results are shown below.

Caseinate-Soybean Oil Emulsion Film. A solution of sodium caseinate ("Alanate" 110, New Zealand Milk Products) in water was made by slowly adding 2.5 g of the sodium caseinate to 20 g of stirring water. The solution was then placed in a high-speed blender, and 2.5 g of soybean oil was added. The mixture was blended for 3 minutes to produce a fine emulsion. This emulsion was 10% by weight caseinate and 10% by weight soybean oil. A film membrane was made from the emulsion by pouring 5 ml of the emulsion onto a plexiglass plate sitting on a level surface and spreading the solution or emulsion evenly over a circle with a diameter of 10 cm. The emulsion was allowed to dry overnight (approximately 18 hours). The result was a film which could be peeled intact from the plexiglass surface and be tested for moisture transmission by placement in a transmission test cell. After this test, the film was placed in water to determine whether it would maintain its structure or dissolve. The results were as follows:

| Film Composition in Test Cell | Relative Moisture Transmission | Film Dissolution |
| --- | --- | --- |
| No film | 100% | — |
| Caseinate (w/glycerol) | 93% | <2 min |
| Caseinate-soybean oil | 49% | <2 min |

As apparent from the above results, the film made from an aqueous solution of casein is highly permeable to moisture and readily disintegrates in water. Also as apparent from the above results, the film made from an emulsion of sodium caseinate and soybean oil had reduced moisture transmission from the test cell (over 50%), but readily disintegrated in water. This means that if this film were formed on a food product, it would reduce moisture loss from the food product, but would lose its integrity if placed on a moist food surface.

EXAMPLE 2

Examples 2 to 4 are presented to provide comparison data regarding relative moisture transmission and film dissolution on films wherein the protein was adjusted to the isoelectric point and films not having the treatment. Because of the requirement that the films be peeled intact to perform the tests, the pH adjustment was not carried out in situ. However, it is believed that the test data from this experimental approach presents valid comparison information about the effect of protein pH adjustment.

Preparation of Films Without pH Adjustment. A solution of sodium caseinate ("Alanate" 110, New Zealand Milk Products) in water was made by slowly adding 2.5 g of sodium caseinate to 20 g of stirring water. The solution was then warmed to above the melting point of beeswax and placed in a pre-warmed high-speed blender. Then 2.5 g of beeswax was added to the blender and the mixture was blended for 3 minutes to produce a fine emulsion. This emulsion was 10% by weight caseinate and 10% by weight beeswax. The emulsion was maintained at a temperature above the melting point of the wax until the films were made. A film membrane was made from the emulsion by pouring 5 ml of the warm emulsion onto a plexiglass plate sitting on a level surface and spreading the solution or emulsion evenly over a circle with a diamaeter of 10 cm. The emulsion was allowed to dry overnight (approximately 18 hours). The result was a film which could be peeled intact from the plexiglass surface and be tested for moisture transmission by placement in a test cell filled with water. The procedure was repeated in turn for carnauba wax and paraffin wax respectively. The results are shown below.

Preparation of Films Having pH Adjustment. The procedure described above was followed, except that after the films had dried they were further treated by soaking for 3 minutes in a calcium ascorbate buffer solution with a pH of 4.6 (the isoelectric point of casein). After the calcium ascorbate buffer soak, the films were further soaked in distilled water to rinse out excess buffer. Then the films were dried overnight before testing. The results were as follows:

| Film Composition In Test Cell | Relative Moisture Transmission | Film Dissolution |
|---|---|---|
| No film | 100% | — |
| Caseinate-carnauba | | |
| Without pH adustment | 51% | <2 min |
| With pH adjustment | 25% | >24 hr |
| Caseinate-paraffin wax | | |
| Without pH adjustment | 30% | <2 min |
| With pH adustment | 23% | >24 hr |
| Caseinate-beeswax | | |
| Without pH adjustment | 24% | <2 min |
| With pH adjustment | 23% | >24 hr |

As shown in the above results, the films made from emulsions of sodium caseinate and wax materials without the pH adjustment step reduced moisture transmission from the test cell (49-76%), but readily disintegrated in water. This means that if one of these films were formed on a substrate, it would reduce moisture loss from the substrate by 49 to 76%, depending on which wax was used; however, these films would lose integrity quickly if placed on moist surfaces.

As shown in the above results, in the case of caseinate-carnauba wax emulsion and caseinate-paraffin wax emulsion, adjustment of the protein pH in the emulsion caused the moisture transmission of the film to be reduced significantly over the comparable film but without pH adjustment. In the case of caseinate-beeswax emulsion having the pH adjustment, only a small reduction in moisture transmission of the resulting film over the untreated comparable film was obtained. One reason for this may be the already low value for transmission conferred by the beeswax without pH adjustment. The treatment rendered all the treated films insoluble in water. Thus, in all cases the life of the coating for the film having the pH adjustment step was significantly increased over the untreated film (from <2 min to >24 hours). These results mean that such treated films would be even better moisture barriers for high moisture substrates than caseinate-wax films which have not been adjusted to the isoelectric point of casein, and that these treated films would not dissolve when formed on moist surfaces.

EXAMPLE 3

A solution of sodium caseinate ("Alanate" 110, New Zealand Milk Products) in water was made slowly adding 2.5 g of sodium caseinate to 20 g of stirring water. The solution was then warmed to above the melting point of an acetylated monoglyceride ("Myvacet" 5-07, Eastman Chemical Products, Inc.) and placed in a pre-warmed high-speed blender. Then 2.5 g of the acetylated monoglyceride was added to the blender and the mixture was blended for 3 minutes to produce a fine emulsion. This emulsion was 10% by weight caseinate and 10% by weight acetylated monoglyceride. The emulsion was maintained at a temperature above the melting point of the acetylated monoglyceride until the films were made. A film membrane was made from the emulsion by pouring 5 ml of the warm emulsion onto a plexiglass plate sitting on a level surface and spreading the solution of emulsion evenly over a circle with a diameter of 10 cm. The emulsion was allowed to dry overnight (approximately 18 hours). The result was a film which could be peeled intact from the plexiglass surface and be tested for moisture transmission by placement in a test cell filled with water. The procedure was repeated for another test, except that the calcium ascorbate buffer treatment described in Example 3 was performed for a caseinate-acetylated monoglyceride film. The results were as follows:

| Film Composition In Test Cell | Relative Moisture Transmission | Film Dissolution |
|---|---|---|
| No film | 100% | — |
| Caseinate-acetylated monoglyceride | | |
| Untreated film | 48% | <2 min |
| Buffer-treated film | 26% | >24 hr |

As apparent from the above results, the buffer treatment (1) decreased the moisture transmission of the casein-acetylated monoglyceride film by 46% compared to the untreated film [calculated as follows: $((48-26)/48) \times 100 = 46\%$] and (2) rendered the film insoluble in water. These results mean that such treated films would be even better moisture barriers for high moisture substrates, and that they would not dissolve when formed on moist surfaces.

EXAMPLE 4

The same procedure followed in Example 3 was repeated, except that other buffer solutions adjusted to the isoelectric point of casein were also evaluated. These buffer solutions included sodium acetate buffer at pH 4.6, sodium ascorbate buffer at pH 4.6, and calcium ascorbate buffer at pH 4.6. The results were as follows:

| Film Composition In Test Cell | Relative Moisture Transmission | Film Dissolution |
|---|---|---|
| No film in test cell | 100% | — |
| Caseinate-acetylated monoglyceride | | |
| Untreated film | 48% | <2 min |
| Sodium acetate buffer-treated film | 26% | >24 hr |
| Sodium ascorbate buffer-treated film | 29% | >24 hr |
| Calcium ascorbate buffer-treated film | 26% | >24 hr |

As apparent from the above results, the different buffer treatments (1) decreased the moisture transmission of the casein-acetylated monoglyceride films by approximately the same amount compared to the untreated film (40-46% reduction compared to the untreated film), and (2) rendered the films insoluble in water. These results mean that the nature of the buffer used is not critical as long as the pH is adjusted appropriately, that such treated films would be even better moisture barriers for high moisture substrates than untreated films, and that buffer-treated films would not dissolve when formed on moist surfaces.

EXAMPLE 5

Examples 5 through 7 provide information about films formed on a high moisture substrate having high moisture at the surface (apple pieces) in accordance with the method of the invention.

A solution of sodium caseinate ("Alanate" 166, New Zealand Milk Products) in water was made by slowly adding 7.5 g of sodium caseinate to 32.5 g of stirring water. The solution was then warmed to above the melting point of the acetylated monoglyceride ("Myvacet" 5-07, Eastman Chemical Products, Inc.) and placed in a pre-warmed high-speed blender. Then, 10 g of the acetylated monoglyceride was added to the blender and the mixture was blended for 3 minutes to produce a fine emulsion. This produced an emulsion which was 15% by weight caseinate and 20% by weight acetylated monoglyceride. The emulsion was then maintained at a temperature (65° C.) above the melting point of the acetylated monoglyceride until the emulsion was used. Apples were selected as a model for all fruits and vegetables with high moisture content. Thus, several apple pieces (cylinders measuring 1 cm in dia and 1 cm long) were cut from the same red delicious apple. Each apple piece was then mounted on a stiff wire which penetrated the piece and had a stand in order to provide easy handling and placement of the pieces. The surface moisture of all the apple pieces was reduced by drying the pieces briefly in a 40° C. forced-air oven for 5 minutes. One of the surface-dried apple pieces was soaked in a calcium ascorbate buffer solution for 10 seconds and then dried again for 5 minutes in a 40° C. forced-air oven. This pre-soaked apple piece was then dipped for 1 to 2 seconds in the caseinate-acetylated monoglyceride emulsion, followed by draining for 3 minutes and then drying for 5 minutes in a 40° C. forced-air oven. Another surface-dried apple piece was not pre-soaked, but was dipped directly into the caseinate-acetylated monoglyceride emulsion for 1 to 2 seconds, followed by draining for 3 minutes and drying for 5 minutes in a 40° C. forced-air oven. This coated apple piece was then soaked in the calcium ascorbate buffer for 10 seconds, followed by drying for 5 minutes in a 40° C. forced-air oven. Another of the apple pieces was neither soaked in calcium buffer nor dipped into the emulsion, but was used as an untreated control for comparison. All the apple pieces were then placed into a desiccator containing anhydrous calcium sulfate to maintain a dry environment with 0% relative humidity. At specified times, the apple pieces were removed briefly from the desiccators for weighing to determine their weight loss because of dehydration. The results are shown in FIG. 1.

It is clear from FIG. 1 that compared to an apple piece with no film membrane (where the relative water loss is 1), apple pieces coated with the caseinate-acetylated monoglyceride emulsion had lower relative water loss. When the apple piece had been soaked in the calcium ascorbate buffer either before or after the emulsion dip, the relative water loss from the apple piece was reduced even further. This represents a 25% reduction in moisture loss over a 3-day period compared to the apple piece coated with the same film, but without the in situ protein modification. This also represents a 35% improvement in the resistance of the film to moisture transmission. It is apparent that adjustment of the casein in the coating membrane to the isoelectric point of casein changed the molecular configuration and interactions of the casein, which in turn improved the moisture-barrier properties of the casein and made the casein insoluble. Thus, the relative moisture loss from the apple through the treated coating membrane was smaller. Comparison of product quality was also made by visual observation. The apple pieces without the coating showed severe shrivelling and browning. The apple pieces with the untreated film showed less shrivelling and less browning. The apple pieces coated with the pH adjustment step showed very little shrivelling and no browning. It is likely that the presence of calcium ascorbate in the treated film helped reduce the extent of browning in the apple pieces coated with the treated film.

EXAMPLE 6

A solution of sodium caseinate ("Alanate" 166, New Zealand Milk Products) in water was made by slowly adding 7.5 g of sodium caseinate to 30 g of stirring water. The solution was then warmed to above the melting point of the acetylated monoglyceride ("Myvacet" 5-07, Eastman Chemical Products) and placed in a pre-warmed high-speed blender. Then, 12.5 g of the acetylated monoglyceride was added to the blender and the mixture was blended for 3 minutes to produce a fine emulsion. This produced an emulsion which was 15% by weight caseinate and 25% by weight acetylated monoglyceride. Then, the same procedure used in Example 5 was followed, except that an additional apple piece was soaked in calcium ascorbate buffer both before and after dippping in the emulsion. The results are shown in FIG. 2.

Figure 2:
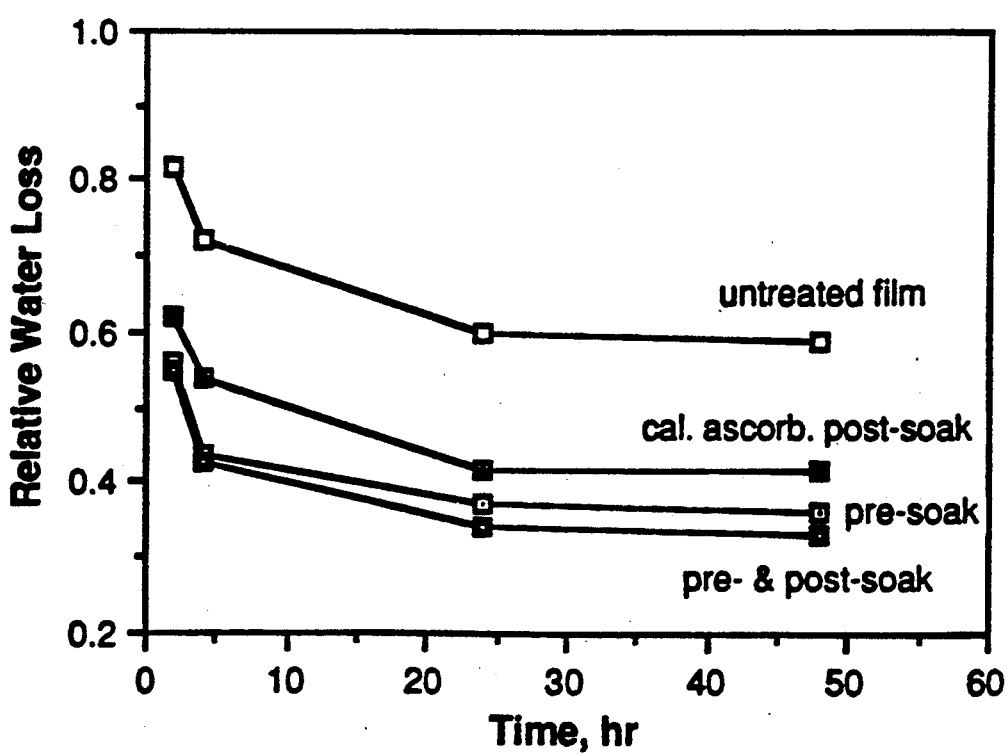
FIG. 2 shows the effect of time on the water loss of peeled and cut apple pieces (cylinders 1 cm in diameter and 1 cm long) which have been coated with casein-acetylated monoglyceride emulsion films, relative to the water loss from an apple piece with no film. The coating composition for the films was 15% sodium caseinate and 25% acetylated monoglyceride in water.

It is clear from FIG. 2 that compared to an apple piece with no film membrane (where the relative water loss is 1), apple pieces coated with the caseinate-acetylated monoglyceride emulsion had lower relative water loss. FIG. 2 also shows that apple pieces coated with an emulsion coating composition of 15% "Alanate" 166 and 25% "Myvacet" 5-07 had lower relative water loss than apple pieces coated with an emulsion coating composition of 15% "Alanate" 166 and 20% "Myvacet" 5-07 (FIG. 1). When the apple piece had been soaked in the calcium ascorbate buffer either before, or after, or both before and after the emulsion dip, the relative water loss from the apple piece was reduced even further. This represents a 30-40% reduction in moisture loss over a 3-day period compared to the apple piece coated with the same film, but without the in situ protein modification. This also represents a 40-70% improvement in the resistance of the film to moisture transmission. The apple pieces without the coating showed severe shrivelling and browning. The apple pieces with the untreated film showed less shrivelling and less browning. The apple pieces coated with the pH adjustment step showed very little shrivelling and no browning.

EXAMPLE 7

The same coating composition and procedure used in Example 5 was used again, except that treated apple pieces received a soak in calcium ascorbate buffer at the isoelectric point of casein (pH 4.6) both before and after dipping in the caseinate-acetylated monoglyceride emulsion.

Figure 3:
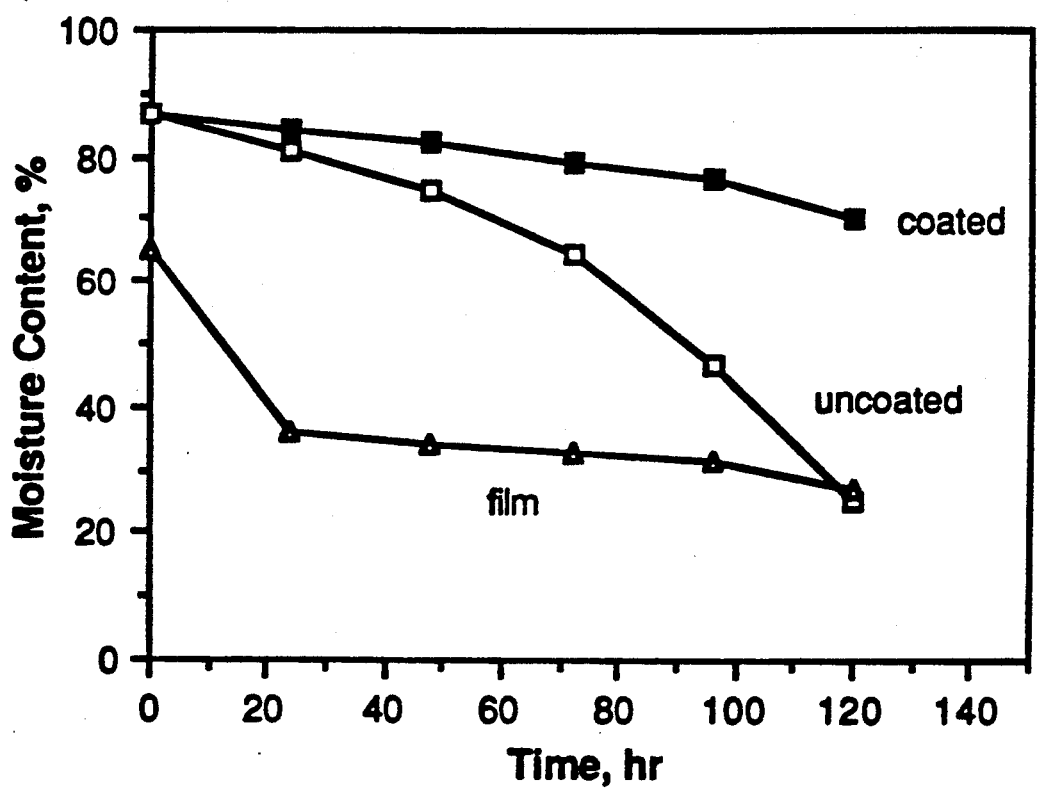
FIG. 3 compares the moisture content of an apple piece coated with a casein-acetylated monoglyceride emulsion film with the moisture content of an apple piece with no film, as a function of time. Moisture content of the film as a function of time is also shown. The coating composition is the same as that stated for FIG. 1.

FIG. 3 compares the moisture content of the uncoated apple pieces with the apple pieces coated with the caseinate-acetylated monoglyceride film over the course of 6 days. Very clearly, the apple pieces which had been coated with the caseinate-acetylated monoglyceride film retained moisture very well compared to the uncoated apple pieces.

It is understood that the foregoing detailed description is given merely by way of illustration and that modification and variations may be made within without departing from the spirit and scope of the invention.

What is claimed is:

1. A method for coating a substrate, which comprises:
   (a) applying an emulsion or suspension to the surface of a substrate, said emulsion or suspension comprising an aqueous solution of a water-soluble protein material and a hydrophobic material, and
   (b) adjusting said protein material in said emulsion or suspension to about its isoelectric point.

2. The method of claim 1 which further includes:
   (c) drying said emulsion or suspension on the substrate.

3. The method of claim 1 wherein said water-soluble protein material comprises a water-soluble form of a protein selected from the group consisting of casein, whey protein, wheat gluten, corn zein, soybean protein, bran protein, and gelatin.

4. The method of claim 1 wherein said hydrophobic material is selected from the group consisting of acetylated monoglycerides, beeswax, carnauba wax, paraffin or liquid soybean oil, hydrogenated soybean oil, cottonseed oil, corn oil, safflower oil, peanut oil, sunflower oil, linseed oil, and sesame oil.

5. The method of claim 1 wherein the ratio of hydrophobic material to water-soluble protein material in said emulsion or suspension is 0.1:1 to 10:1.

6. The method of claim 1 wherein the substrate is a high moisture agricultural product.

7. The method of claim 6 wherein said high moisture agricultural product is selected from the group consisting of plants, plant materials, fish, eggs, baked goods, and cheese.

8. The method of claim 1 wherein the substrate is a high moisture agricultural product having high moisture at the surface.

9. The method of claim 8 wherein said agricultural product is selected from the group consisting of fruits or vegetables having one or more exposed tissue surfaces, peeled eggs, fish filets, tissue cultures, and cut-stem flowers.

10. The method of claim 1 wherein said adjusting of said protein material and said applying of said emulsion or suspension is carried out as follows: the surface of the substrate is adjusted to about the isoelectric point of said protein material, and then said emulsion or suspension is applied to said adjusted surface.

11. The method of claim 1 wherein said adjusting of said protein material and said applying of said emulsion or suspension is carried out as follows: said emulsion or suspension is applied to the surface of the substrate, and then the protein material in the emulsion or suspension is adjusted to about its isoelectric point.

12. The method of claim 1 wherein said adjusting of said protein material and said applying of said emulsion or suspension is carried out as follows: the surface of the substrate is treated with a buffer having about the pH of the isoelectic point of said protein material, said emulsion or suspension is applied to said treated surface, and said emulsion or suspension is treated with a buffer having about the pH of the isoelectic point of said protein material to adjust said protein material to about its isoelectric point.

13. A substrate coated with an emulsion or suspension comprising an aqueous solution of a water-soluble protein material and a hydrophobic material, said coated substrate prepared in accordance with the method of claim 2.

14. The coated substrate of claim 13 wherein said water-soluble protein material is a water-soluble form of a protein selected from the group consisting of casein, whey protein, wheat gluten, corn zein, soybean protein, bran protein, and gelatin.

15. The coated substrate of claim 13 wherein said hydrophobic material is selected from the group consisting of acetylated monoglycerides, beeswax, carnauba wax, paraffin, liquid soybean oil, hydrogenated soybean oil, cottonseed oil, corn oil, safflower oil, peanut oil, sunflower oil, linseed oil, and sesame oil.

16. The coated substrate of claim 13 wherein said substrate is a high moisture agricultural product.

17. The coated substrate of claim 13 wherein said substrte is a high moisture agricultural product selected from the group consisting of plants, plant materials, fish, eggs, baked goods, and cheese.

18. The coated substrate of claim 13 wherein said substrate is a high moisture agricultural product having high moisture at the surface.

19. The coated substrate of claim 13 wherein said substrate is a high moisture agricultural product having high moisture at the surface, said product selected from the group consisting of fruits or vegetables having one or more exposed tissue surfaces, peeled eggs, fish filets, tissue cultures, and cut-stem flowers.

20. A protective film having improved moisture barrier properties prepared by (a) forming a coating of an emulsion or suspension of a water-soluble protein material and a hydrophobic material, (b) contacting said water-soluble protein material in said emulsion or suspension with a pH adjusting solution to adjust the pH of said protein to about its isoelectric point, and (c) drying said adjusted emulsion or suspension to form a film.

* * * * *